United States Patent
Tanahashi et al.

(10) Patent No.: US 9,048,704 B2
(45) Date of Patent: Jun. 2, 2015

(54) STATOR MANUFACTURING METHOD

(75) Inventors: Fumiki Tanahashi, Toyota (JP);
Yukihiko Nakagami, Toyota (JP);
Yoshinori Matsuda, Toyota (JP); Koji Suwa, Seto (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 283 days.

(21) Appl. No.: 13/695,546

(22) PCT Filed: Jun. 18, 2010

(86) PCT No.: PCT/JP2010/060355
§ 371 (c)(1),
(2), (4) Date: Oct. 31, 2012

(87) PCT Pub. No.: WO2011/158374
PCT Pub. Date: Dec. 22, 2011

(65) Prior Publication Data
US 2013/0047419 A1    Feb. 28, 2013

(51) Int. Cl.
*H02K 15/00* (2006.01)
*H02K 1/14* (2006.01)
*H02K 15/06* (2006.01)

(52) U.S. Cl.
CPC .............. *H02K 1/146* (2013.01); *H02K 15/066* (2013.01)

(58) Field of Classification Search
CPC ............. H02K 3/28; H02K 3/12; H02K 3/46; H02K 15/026; H02K 15/0056; H02K 15/024

USPC ........... 29/596, 598, 605, 606, 609; 310/180, 310/201, 208, 216.063, 418
See application file for complete search history.

(56) References Cited

U.S. PATENT DOCUMENTS

| | | | |
|---|---|---|---|
| 7,239,059 B2* | 7/2007 | Maeda et al. | 310/180 |
| 2001/0005104 A1 | 6/2001 | Nakahara et al. | |
| 2001/0005933 A1 | 7/2001 | Kazama et al. | |
| 2003/0189387 A1 | 10/2003 | Nakahara et al. | |
| 2004/0244184 A1 | 12/2004 | Nakahara et al. | |
| 2010/0066198 A1 | 3/2010 | Fubuki et al. | |

FOREIGN PATENT DOCUMENTS

| | | |
|---|---|---|
| CN | 1178410 A | 4/1998 |
| CN | 101657953 A | 2/2010 |
| JP | 55-173261 U | 12/1980 |
| JP | 01-180838 U | 12/1989 |

(Continued)

OTHER PUBLICATIONS

International Search Report of PCT/JP2010/060355 mailed Sep. 7, 2010.

*Primary Examiner* — Thiem Phan
(74) *Attorney, Agent, or Firm* — Kenyon & Kenyon LLP

(57) ABSTRACT

A stator structure which enables coils to be fitted over teeth while the circularity of the stator core and the parallelism between the end surfaces of the stator core are maintained. A stator structure is provided with: a stator core which is formed by stacking steel plates and which comprises a yoke and teeth; and coils which are fitted over the teeth so as to surround the teeth. A cut is formed only in one part of the yoke, and the cut is opened. Opening the cut allows the coils to be fitted over the teeth while the circularity of the stator core and the parallelism between the end surfaces of the stator core are maintained.

4 Claims, 12 Drawing Sheets

(56) References Cited

FOREIGN PATENT DOCUMENTS

| | | |
|---|---|---|
| JP | 09-168257 A | 6/1997 |
| JP | 10-075552 A | 3/1998 |
| JP | 2000-245081 A | 9/2000 |
| JP | 2001-186697 A | 7/2001 |
| JP | 2001-251819 A | 9/2001 |
| JP | 2002075552 A | 3/2002 |
| JP | 2002-281697 A | 9/2002 |
| JP | 2006-352991 A | 12/2006 |
| JP | 2007-155468 A | 6/2007 |
| JP | 2008-312290 A | 12/2008 |

* cited by examiner

STATOR MANUFACTURING METHOD

CROSS-REFERENCE TO RELATED APPLICATIONS

This is a 371 national phase application of PCT/JP2010/060355 filed on 18 Jun. 2010, the entire contents of which are incorporated herein by reference.

FIELD OF THE INVENTION

The present invention relates to a stator structure including a stator core made of laminated steel plates and provided with a yoke part and teeth parts and coils wound around and mounted on the teeth parts.

BACKGROUND OF THE INVENTION

Some stator cores are configured such that coils are mounted or fitted on teeth parts of the stator core. The circularity of the stator core (stator-core circularity) and the parallelism of end faces (end-face parallelism) of the stator core are determined depending on press accuracy. For a one-piece stator core which can be produced by a single press work to steel plates, therefore, the stator-core circularity and the end-face parallelism can be easily enhanced as compared with a split stator core produced by assembling split core pieces individually.

The one-piece stator core is manufactured for example by mounting edgewise coils on teeth parts in sequence. However, for a stator core 100, as shown in FIG. 14, when a last coil 109 is to be mounted on a teeth part 108, the last coil 109 interferes with a firstly mounted coil 105 and a coil 107 which are to be adjacent to the coil 109. Specifically, as illustrated in FIG. 15 showing an enlarged view of a part indicated by a chain line R in FIG. 14, the mounting width S of the coil 109 is wider than the mountable width U between the adjacent coils 105 and 107. Thus, the last coil 109 could not be mounted on the teeth part 108. In the case where the coils are mounted on the teeth parts in sequence, therefore, the last coil 109 could not be mounted on the teeth part 108.

As this type of technique, there is conventionally a stator core 200 described in Patent Document 1 shown in FIG. 16. As shown in FIG. 16, stator parts 201 of the stator core 200 are formed, on an inner peripheral, with teeth parts 203. Slits 206 are formed on both sides of each stator part 201. When bundled coil wires are to be mounted on the teeth parts 203 of the stator parts 201, the outer periphery of each stator part 201 is pressed. This causes deformation of each stator part 201 allowed by the slits 206 formed on both sides of each stator part 201. When one stator part 201 is externally pressed, thereby widening the slits 206, the corresponding teeth part 203 is made to protrude inward. Since each teeth part 203 is caused to protrude inward, the bundled coil wires are allowed to be mounted thereon.

As above, the stator parts 201 are pressed externally in sequence so that the bundled coil wires are mounted on the teeth parts 203.

RELATED ART DOCUMENTS

Patent Documents

Patent Document 1: JP-A-2000-245081
Patent Document 2: JP-A-2001-251819
Patent Document 3: JP-A-2006-352991

SUMMARY OF INVENTION

Problems to be Solved by the Invention

However, the conventional arts have the following disadvantages. Specifically, the stator core 200 has a problem that the stator parts 201 have to be pressed individually for each teeth part 203 to mount the bundled coil wires on the teeth parts 203. Therefore, in a case of the teeth parts 203 provided at twelve places in the whole circumference, the outer periphery of the stator parts 201 have to be pressed twelve times so that the coil is mounted on the teeth parts 203. Such twelve-times pressing of the outer periphery of the stator parts 201, increasing the number of steps, results in deteriorated productivity.

In the stator core 200, the slits 206 are formed over the whole circumference of the inner periphery. Due to the slits 206 formed in the whole circumference, the circularity of the stator core 200 and the parallelism of end faces of the stator core 200 are deteriorated.

The stator-core circularity represents the circularity of a hollow cylindrical stator core. The end-face parallelism represents the parallelism of an end face forming an inner wall of the hollow part of the hollow cylindrical stator core with respect to a central axis. Based on the stator-core circularity and the end-face parallelism, the stator core and a rotor set in the hollow part of the stator core are controlled in three dimensions to avoid the stator core and the rotor from bumping or colliding with each other.

If the stator-core circularity and the end-face parallelism are low, the rotor has to be reduced in size to prevent bumping or colliding with the stator core. Such a size-reduced rotor generates a wide gap between the stator core and the rotor and thus a magnetic flux density between the stator core and the rotor lowers. This results in a decrease in motor power.

The circularity and the end-face parallelism of the stator core 200 are deteriorated for the following reasons. When the outer periphery of the stator part 201 is pressed, the stator part 201 is allowed to be deformed by the slits 206. When pressing on the stator part 201 is stopped, the stator part 201 returns to an original position by a restoring force. Although each stator part 201 returns to its original shape by the restoring force, the stator parts 201 actually have different restoring forces because of the slits 206 arranged over the whole circumference. Therefore, the circularity and the end-face parallelism of the stator core 200 are deteriorated by the total of differences in restoring force depending on the slits 206.

The present invention has been made to solve the above problems and has a purpose to provide a stator structure in which coils can be mounted on teeth parts while keeping circularity and end-face parallelism of a stator core.

Means of Solving the Problems

To achieve the above purpose, one aspect of the invention provides a stator structure configured as below.
(1) In a stator structure including a stator core made of laminated steel plates and provided with a yoke part and teeth parts and coils wound around and mounted on the teeth parts, the yoke part is formed with a cut section only in one place, and the coil is mounted on the teeth part by opening the cut section in a circumferential direction of the stator core.
(Deleted)
(2) In the stator structure in (1), an engagement protrusion is formed in one end of the both end portions of the cut section, and an engagement recess is formed in the other end of the both end portions, the engagement recess being engageable with the engagement protrusion.

(3) In the stator structure in (2), the engagement protrusion is formed in a lamination direction, and the engagement recess is formed in the lamination direction.

(4) In the stator structure in (2), the engagement protrusion is formed in a radial direction, and the engagement recess is formed in the radial direction.

(5) In a stator manufacturing method including mounting coils on a stator core made of laminated steel plates and provided with a yoke part and teeth parts so that the coils are wound around the teeth parts, the yoke part is formed with a cut section only in one place, and the method includes a step of mounting the coil on the teeth part by opening the cut section in a circumferential direction of the stator core.

(6) In the stator manufacturing method in (5), an engagement protrusion is formed in one end of the both end portions of the cut section, and an engagement recess is formed in the other end of the both end portions, the engagement recess being engageable with the engagement protrusion.

(7) In the stator manufacturing method in (5), the engagement protrusion is formed in a lamination direction, and the engagement recess is formed in the lamination direction.

(8) In the stator manufacturing method in (5), the engagement protrusion is formed in a radial direction, and the engagement recess is formed in the radial direction.

Effects of the Invention

The operations and advantageous effects of the above stator structure will be explained.

(1) In a stator structure including a stator core made of laminated steel plates and provided with a yoke part and teeth parts and coils wound around and mounted on the teeth parts, the yoke part is formed with a cut section only in one place. Accordingly, the coils can be mounted on the teeth parts while maintaining the circularity and the end-face parallelism. The reason is as follows. When a coil is to be mounted on a last teeth part, on which a coil could not be mounted in a conventional art, the cut section is opened or split to allow the coil to be mounted on the last teeth part. Opening the cut section is conducted within the elastically deformable range of the stator core. This is because, as long as an open width of the cut section is within the elastically deformable range of the stator core, the stator core can return to its original shape with high circularity and high end-face parallelism by the elasticity without causing plastic deformation of the cut section.

Since the cut section is formed in one place, the cut section does not need to be opened when the coils excepting a coil to be mounted on a last teeth part are to be mounted on teeth parts. Thus, the coils can be mounted on the teeth parts while the cut section remains in an original state. Accordingly, the cut section has only to be opened only one time to mount the coil on the last teeth part, so that the circularity and the end-face parallelism substantially remain unchanged. Furthermore, since the cut section has only to be opened only one time, an assembling efficiency is high and a manufacturing cost can be reduced.

(2) The coil is mounted on the teeth part by opening the cut section. Accordingly, the coil can be easily mounted on the last teeth part. The reason is as follows. The stator consists of laminated steel plates, which has low rigidity. This allows the cut section to be opened easily by a few of millimeters within the elastically deformable range. Since the cut section formed in the yoke part beside the last teeth part is allowed to open, it is possible to generate a gap with a coil mounting width needed to mount a coil.

When the cut section is opened by a few of millimeters within the elastically deformable range and then is to be returned to its original position in the case where the cut section, the cut section will return to its original shape by the elasticity of the yoke part. Thus, the cut section can easily return to the original shape without needing application of a returning force thereto. This can reduce a manufacturing cost.

(3) The one-end protrusion is formed in one end of both end portions of the cut section and an other-end protrusion in the other end of the both end portions of the cut section, the one-end protrusion and the other-end protrusion protruding from an outer periphery of the yoke part. Accordingly, the cut section of the stator core can be opened while maintaining the circularity and the end-face parallelism. The reason is as follows. When the yoke part is directly grasped with a handle or the like and a force to open the cut section is exerted on the yoke part, the yoke part may be deformed by the handle or the like and thus the circularity and the end-face parallelism could not be maintained. However, when the force to open the cut section is directly applied to the one-end protrusion and the other-end protrusion formed on the outer periphery of the yoke part, the yoke part needing to maintain the circularity and the end-face parallelism is not directly grasped and therefore the yoke part is not deformed. This can keep the circularity of the stator core and the parallelism of the end face.

Separating the one-end protrusion and the other-end protrusion formed on the outer periphery of the yoke part is easier than opening the cut section by the opening force directly applied to the yoke part. This is because, when the cut section is to be opened, the outer peripheral portion formed distantly from the stator core only needs a smaller force. Accordingly, by separating the one-end protrusion and the other-end protrusion both formed on the outer peripheral part, the cut section formed in the yoke part can be easily opened. This makes it possible to enhance an assembling efficiency to insert a coil on the last teeth part and thus reduce a manufacturing cost.

(4) The contact surfaces of the one-end protrusion and the other-end protrusion contacting with each other are formed with gap-forming recesses. Accordingly, they can be easily separated. Specifically, a tool is allowed to be inserted in the gap-forming recesses, and thus these recesses can be separated easily with the tool to open the cut section.

(5) The gap-forming recesses are elliptic. Accordingly, the cut section can be easily opened. Specifically, a tool having an elliptic shape smaller than the elliptic gap-forming recesses is inserted in the recess. This elliptic tool has an elliptic shape having a major axis and a minor axis. Therefore, when the elliptic tool is turned 90°, the gap-forming recesses are separated by a distance corresponding to a value obtained by subtracting the minor axis from the major axis of the elliptic shape. Thus, the cut section can be easily opened by simply turning the elliptic tool 90°.

By turning the elliptic tool by 90°, it is possible to accurately open the cut section by a fixed distance. To be concrete, owing to the elliptic tool has the elliptic shape having the major axis and the minor axis, the gap-forming recesses are separated by the distance corresponding to a value obtained by subtracting the minor axis from the major axis of the elliptic shape. This allows the cut section to open accurately open by a fixed distance.

(6) The engagement protrusion is formed in one end of the both end portions of the cut section, and the engagement recess is formed in the other end of the both end portions, the engagement recess being engageable with the engagement protrusion. Accordingly, when the cut section is opened and then fully returns to its original shape by the elasticity, the cut section of the stator core can be returned to the original shape while keeping the circularity and the end-face parallelism. Specifically, while the opened cut section is returning fully to its original shape, the engagement protrusion and the engagement recess serve as a guide for the returning motion. Owing to these protrusion and recess serving as a guide for returning of the cut section, the cut section can return to its original shape. Therefore, the stator core can return to a shape having high circularity and high end-face parallelism without causing plastic deformation.

The engagement protrusion and the engagement recess are designed to have a larger step (difference in length) between the protrusion and the recess than a range allowing the cut section to be opened during coil assembling. Thus, the protrusion and the recess can serve as a guide without causing the stator core from disassembling.

(7) The engagement protrusion is formed in a lamination direction, and the engagement recess is formed in the lamination direction. Accordingly, this can prevent a displacement of the cut section in the lamination direction. Since the thickness of the stator core is larger in the lamination direction than in the radius direction, the engagement protrusion and the engagement recess may be formed in two or more places in the lamination direction. Two or more engagement protrusions and recesses allow the cut section to more reliably return to its original position when the cut section is to fully return.

(8) The engagement protrusion is formed in a radial direction, and the engagement recess is formed in the radial direction. Accordingly, this can prevent a displacement of the cut section in the radius direction. Since the stator core is formed with the engagement protrusion and engagement recess in the radius direction, they can be produced by use of a press die used for shaping one steel plate. This is because the stator core can be manufactured by laminating steel plates having the same shape. This can more reduce the manufacturing cost than in an engagement portion is formed in the lamination direction.

DETAILED DESCRIPTION

First Embodiment

<Whole Structure of Stator Core>

Figure 1:
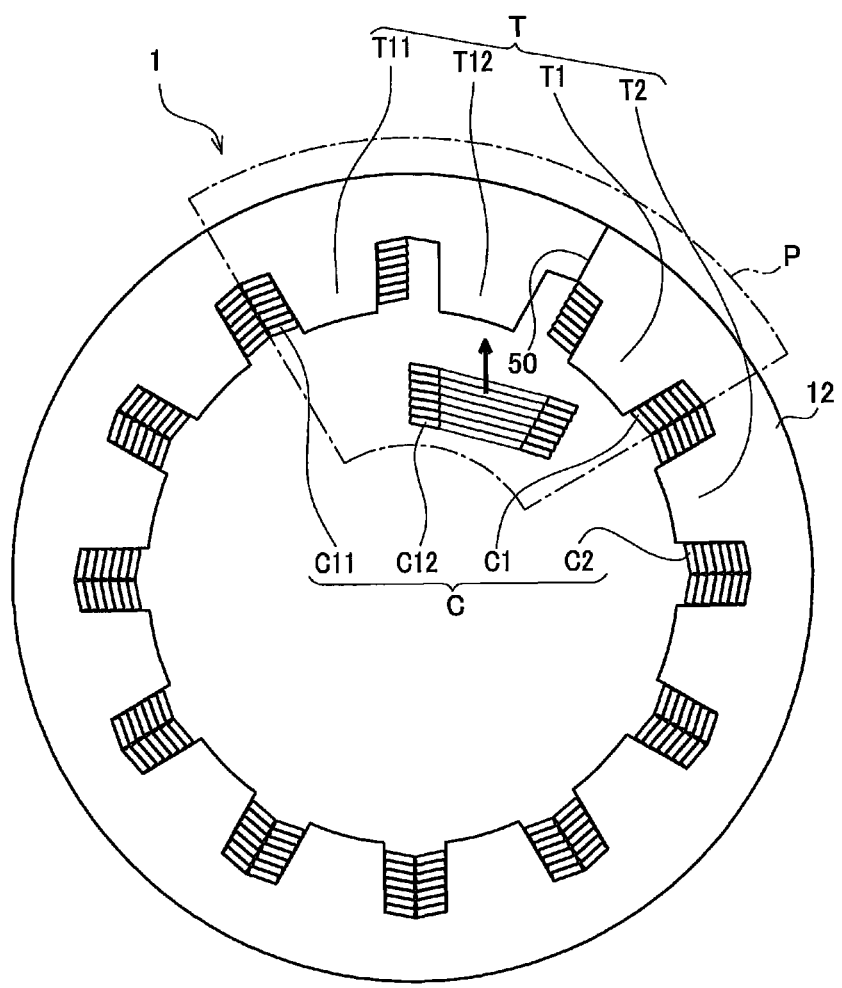
FIG. 1 is a diagram showing a step (1) of mounting a coil in a stator core in a first embodiment of the invention.
Figure 2:
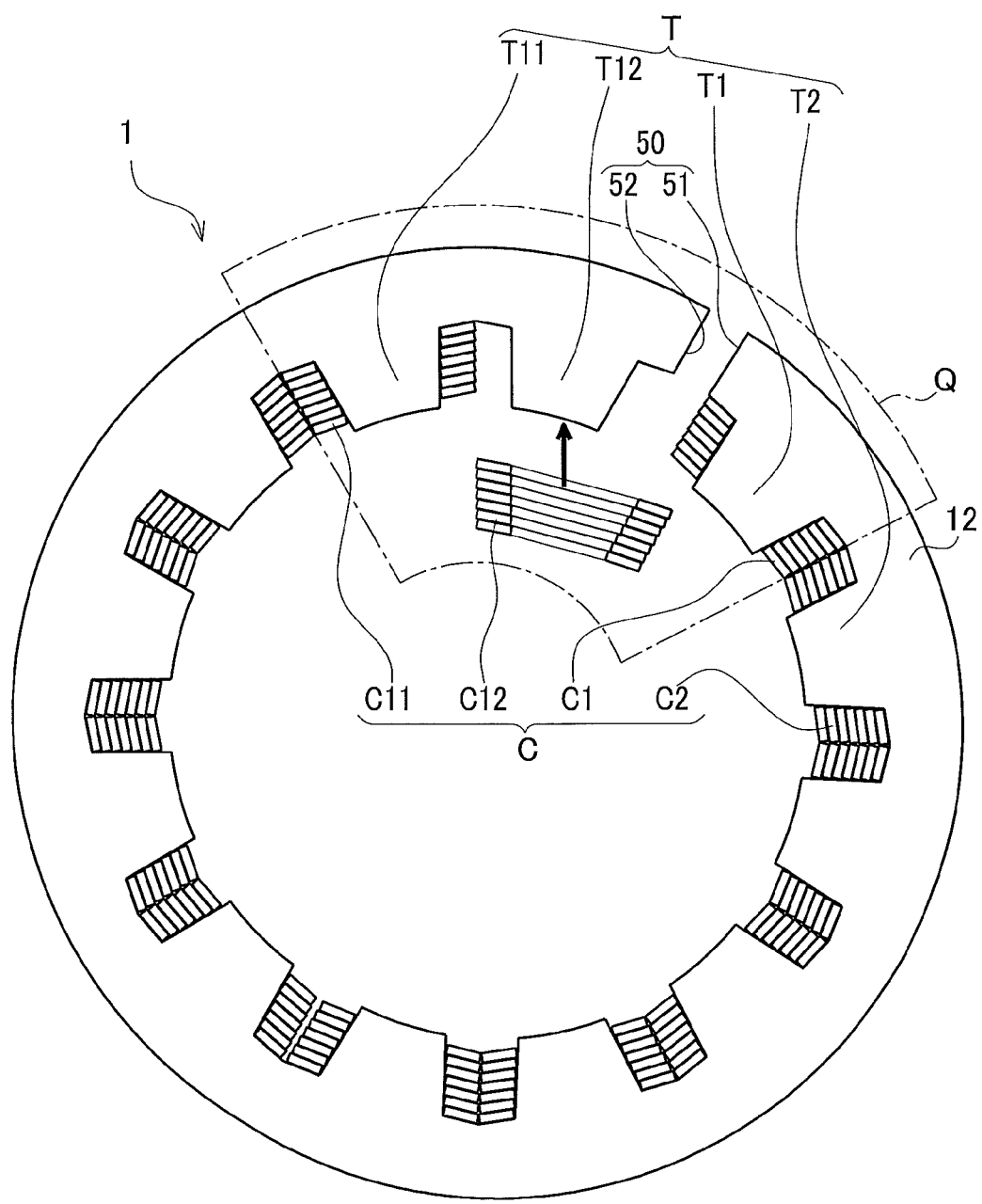
FIG. 2 is a diagram showing a step (2) of mounting the coil in the stator core in the first embodiment of the invention.
Figure 3:
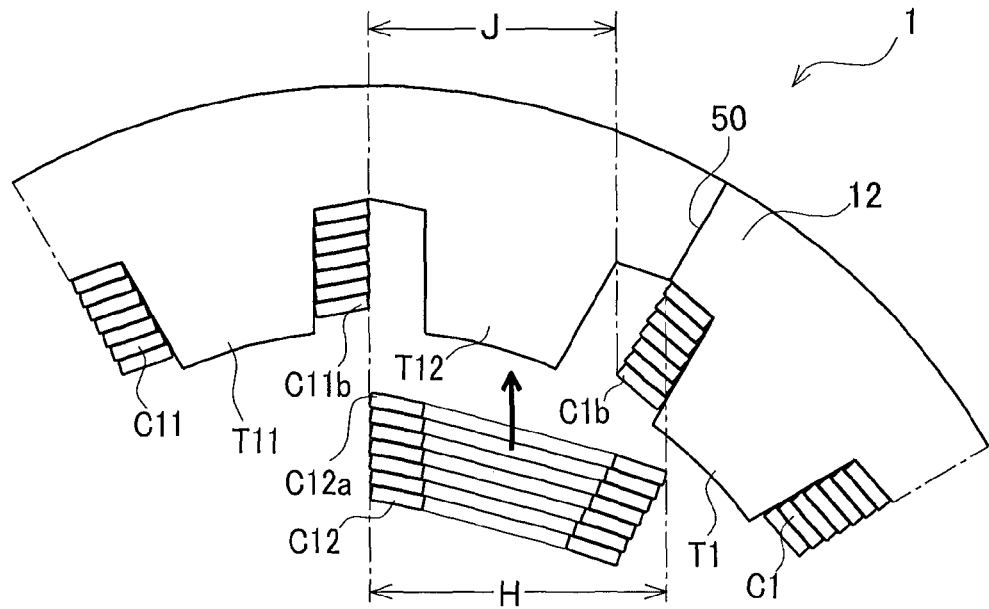
FIG. 3 is a partial enlarged view of a part enclosed by a chain line P in FIG. 1 in the first embodiment of the invention.
Figure 4:
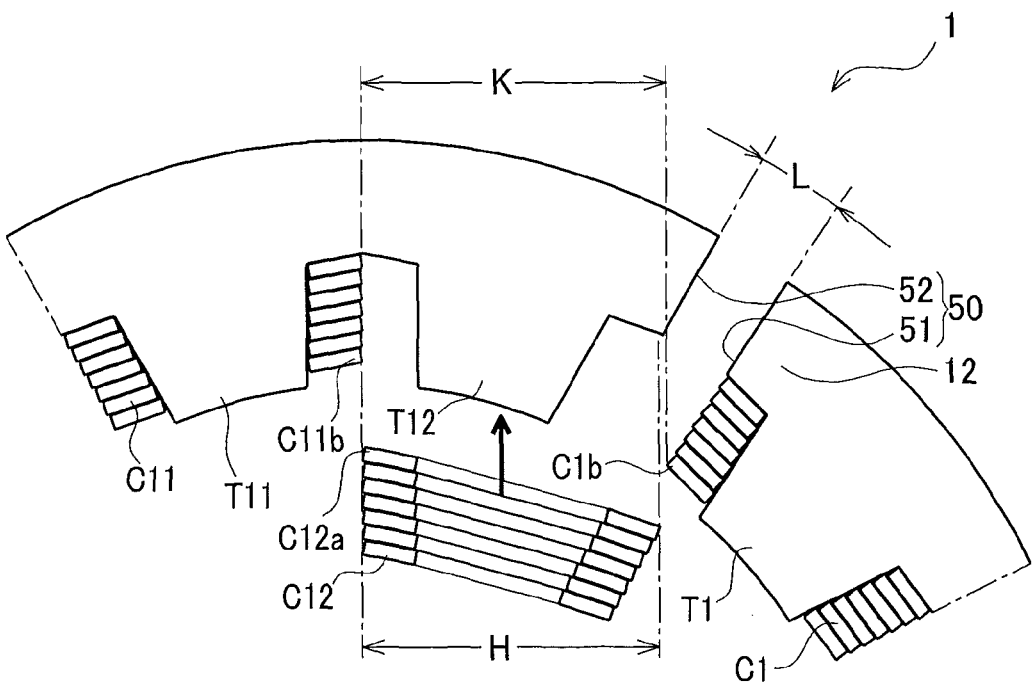
FIG. 4 is a partial enlarged view of a part enclosed by a chain line Q in FIG. 2 in the first embodiment of the invention.
Figure 5:
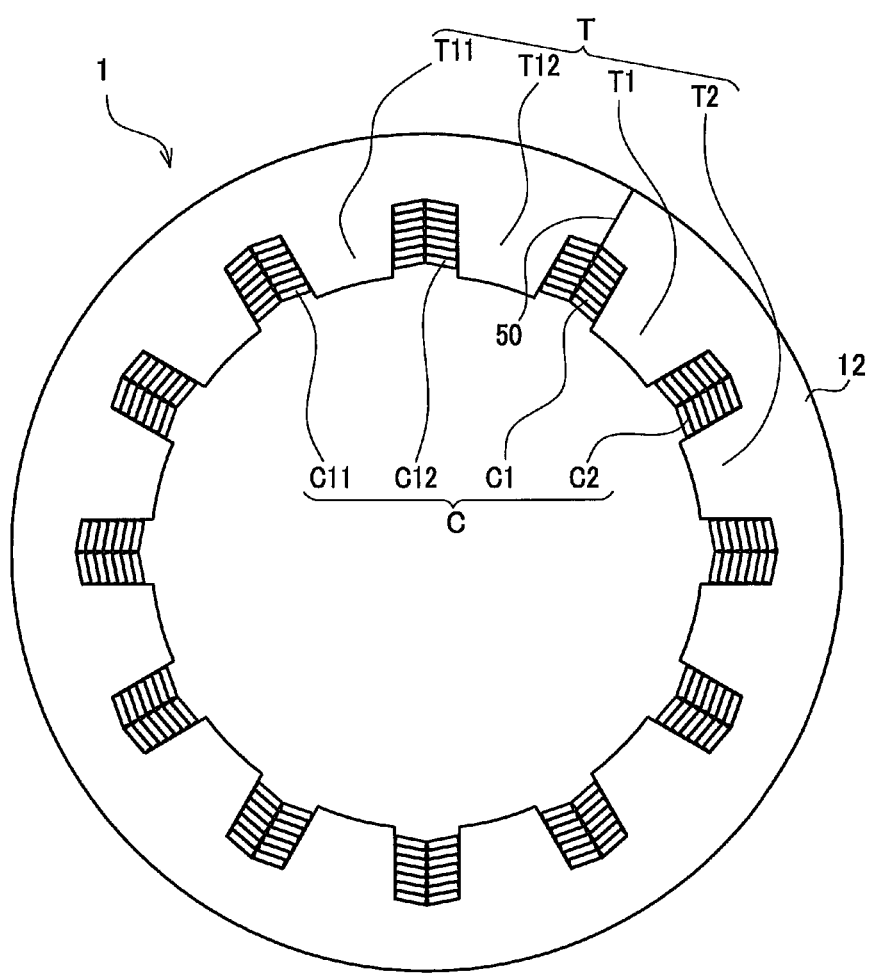
FIG. 5 is a diagram showing a step (3) of mounting the coil in the stator core in the first embodiment of the invention.

FIG. 1 is a diagram showing a step (1) of mounting a coil C in a stator core 1. FIG. 2 is a diagram showing a step (2) of mounting the coil C in the stator core 1. FIG. 3 is a partial enlarged view of a part enclosed by a chain line P in FIG. 1. FIG. 4 is a partial enlarged view of a part enclosed by a chain line Q in FIG. 2. FIG. 5 is a diagram showing a step (3) of mounting the coil C in the stator core 1.

The stator core 1 in FIG. 1 is made of a plurality of thin steel plates not shown laminated or stacked in two or more layers and in a hollow cylindrical shape. In the present embodiment, the stator core 1 has a diameter of 200 mm. On the inner peripheral surface of the stator core 1, there are formed twelve teeth parts T at a predetermined pitch. The twelve teeth parts T are referred to as a first teeth part T1, a second teeth part T2, . . . , and a twelfth teeth part T12.

The teeth parts T support twelve coils C each of which is formed of a conductor wire having a flat rectangular cross section and wound in more than one turn. In the present embodiment, the coils C include twelve coils C in correspondence with the twelve teeth parts T. The twelve coils C are referred to as a first coil C1, a second coil C2, . . . , and a twelfth coil C12.

(Configuration of Cut Section)

As shown in FIG. 1, the stator core 1 is formed with a cut section 50 extending in a radial direction. The cut section 50 is formed through all the thin steel plates. When a pull force is applied to the stator core 1, the stator core 1 is elastically deformed as shown in FIG. 2, thus opening or splitting the cut section 50. The cut section 50 includes one end 51 formed on a first teeth part T1 side of the yoke part 12 and the other end 52 formed on a twelfth teeth part T12 side of the yoke part 12. Opening of the cut section 50 therefore means that the one end 51 and the other end 52 are separated from each other. While no force is applied to the cut section 50, as shown in FIGS. 1 and 3, the one end 51 and the other end 52 are in contact with each other.

When the stator core 1 is elastically deformed by application of the pull force, the cut section 50 is opened in an elastically deformable range of the core 1, generating a gap L as shown in FIG. 4. The width of the gap L is defined as a distance from the one end 51 to the other end 52 of the cut section 50. The width of the gap L in the present embodiment is about 3 mm. Because this about 3-mm width of the gap L corresponds to the elastically deformable range and falls in a range that does not have any influence on circularity and parallelism of end faces (end-face parallelism) after the stator core 1 returns to its original shape by its elasticity (elastic force). Further, when the gap L is generated by a width of about 3 mm, it can provide a distance long enough to insert the last twelfth coil C12 on the last twelfth teeth part T12. In the stator core 1 having a diameter of 200 mm, such a mere about 3-mm width of the gap L hardly influences the circularity and the end-face parallelism.

The cut section 50 can be formed by cutting when the thin steel plates are formed by press. Alternatively, the cut section 50 may be formed simultaneously with press work.

Although the width of the gap L is set to about 3 mm in the present embodiment, the width of the gap L is not limited to about 3 mm as long as it is in the elastically deformable range and in a region in which the stator core 1 is not plastically deformed. Specifically, the elastically deformable range may be changed according to the materials of the stator core 1 and also according to the size of the stator core 1. Thus, the width of the gap L is not limited to about 3 mm set in the present embodiment.

Furthermore, the width of the gap L has only to be determined as a width allowing the last twelfth coil C12 to be mounted on the last twelfth teeth part T12. According to the cases where the number of teeth parts is increased to 18, 24, etc. or decreased to 9 or 6 as alternatives to the present embodiment including twelve teeth parts, the width of the gap L is changed.

In FIGS. 2 and 4, the width of the gap L to open the cut section 50 is illustrated to be large as a conceptual diagram to facilitate understanding thereof. Actually, the width of the gap L is as small as about 3 mm.

(Configuration of Coil)

Figure 13:
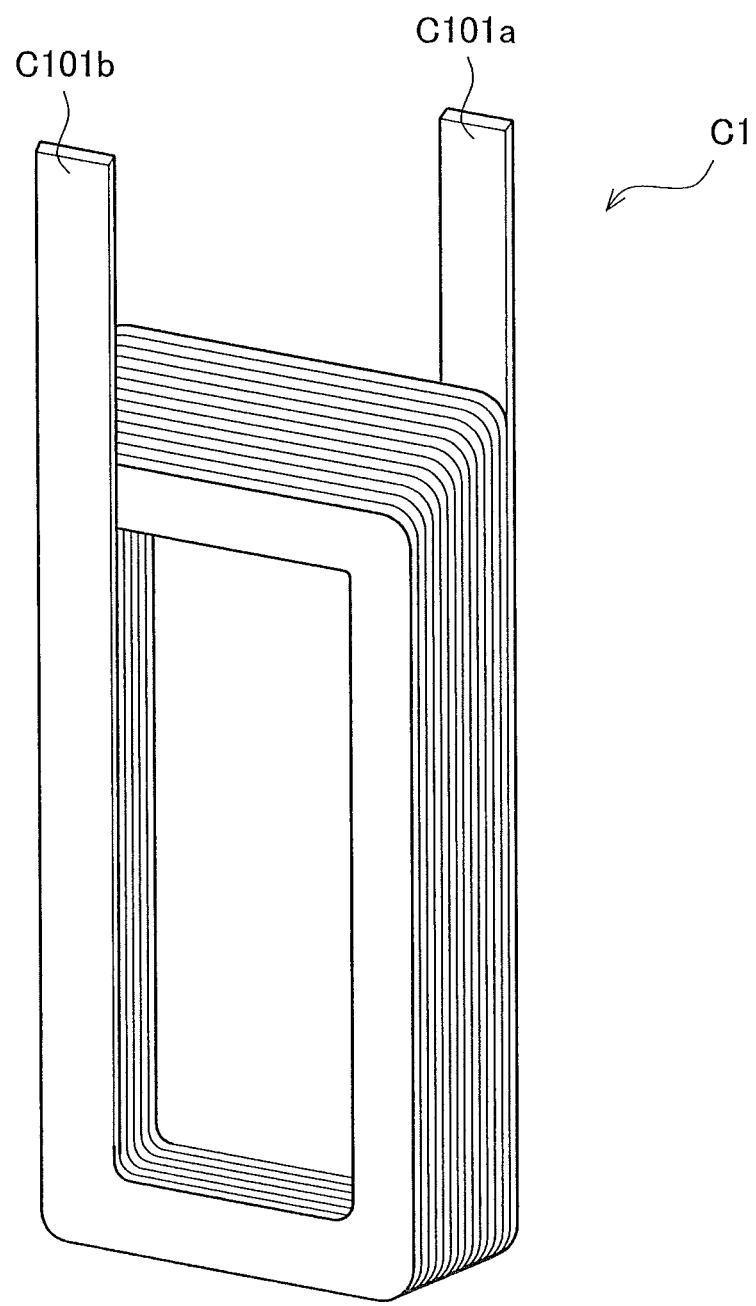
FIG. 13 is a perspective external view of a coil in the first embodiment of the invention.

FIG. 13 is an external perspective view of the first coil C1. Although FIG. 13 describes the first coil C1, the second coil C2 to the twelfth coil C12 are also configured similarly. As shown in FIG. 13, the first coil C1 is a coil made by edgewise bending a flat rectangular conductor wire by use of an edgewise bending wiring device not shown.

The first coil C1 has a first end portion C101a and a second end portion C101b. One of the first end portion C101a and the second end portion C101b is a winding starting end and the other is a winding ending end. The first coil C1 is formed of a wire wound in a nearly trapezoidal shape so that short sides are gradually longer as the wire is wound to the first end portion C101a side.

In the present embodiment, an edgewise coil is explained as the finished first coil C1. The same applies to any other types of coils having finished shapes, irrespective of what shape the cross section has, circular or rectangular.

<Method of Mounting Coil in Stator Core>

(First Step)

As shown in FIG. 1, the coils C are sequentially mounted on the teeth parts T of the stator core 1. To be concrete, the first coil C1 is mounted on the first teeth part T1 formed in one end of the cut section 50, the second coil C2 is mounted on the second teeth part T2, . . . , so that eleven coils C are mounted sequentially on eleven teeth parts T.

After eleven coils C are mounted on eleven teeth parts T as shown in FIGS. 1 and 3, the twelfth coil C12 is not allowed to be mounted on the twelfth teeth part T12 formed in the other end of the cut section 50.

Specifically, as shown in FIG. 3, a mounting width H which is defined as a mounting width of the twelfth coil C12 on a first end portion C12a side is wider than a mountable width J defined from the second end portion C1b of the first coil C1 to a second end portion C11b of the eleventh coil C11 to receive a coil. Thus, the first coil C1 and the eleventh coil C11 interfere with the twelfth coil C12 to be mounted.

(Second Step)

To mount the twelfth coil C12 on the twelfth teeth part T12, a pull force in a circumferential direction is applied to the cut section 50 of the stator core 1. To be concrete, both end portions of the cut section 50 of the yoke part 12 are grasped from above and below and moved apart from each other in the circumferential direction. The circumferential pull force exerted on the cut section 50 elastically deforms the stator core 1. When the stator core 1 is elastically deformed as shown in FIG. 4, the cut section 50 is opened in the elastically deformable range, thereby generating the gap L. The width of the gap L in the present embodiment is a distance of about 3 mm.

When the gap L is generated as shown in FIG. 4, the width from the second end portion C1b of the first coil C1 to the second end portion C11b of the eleventh coil C11 is widened from the mountable width J to a mountable width K. The distance determined by subtracting the mountable width J from the mountable width K is proportional to the width of the gap L.

The mountable width K from the second end portion C1b of the first coil C1 to the second end portion C11b of the eleventh coil C11 is larger than the mounting width H of the twelfth coil C12 on the side of the first end portion C12a. Therefore, the twelfth coil C12 can be mounted on the twelfth teeth part T12 without being interfered by the first coil C1 and the eleventh coil C11.

(Third Step)

After the twelfth coil C12 is mounted on the twelfth teeth part T12, the circumferential pull force exerted on the cut section 50 is removed. Upon removal of the pull force, the stator core 1 returns by its elasticity to its original state shown in FIG. 5. When the stator core 1 returns to the original state shown in FIG. 5, the one end 51 and the other end 52 of the cut section 50 are brought in contact with each other, and the gap L disappears. Since the gap L disappears, the first coil C1 and the twelfth coil C12 approach each other.

The stator core 1 comes to the state shown in FIG. 5 by the elasticity and therefore does not cause plastic deformation. Because of no plastic deformation, the stator core 1 can maintain the circularity and the end-face parallelism of the original stator core 1.

(Opening Cut Section)

The details of opening or splitting the cut section 50 in the second and third steps will be explained.

When the pull force in the circumferential direction is applied to the cut section 50 to generate the gap L in the stator core 1, the gap L can be generated without affecting the circularity and the end-face parallelism of the stator core 1. The reason thereof is as below. Since the stator core 1 is applied with the pull force in the elastically deformable range, the stator core 1 will return to its original shape by its elasticity. Therefore, the circularity and the end-face parallelism of the stator core 1 remain unchanged from those obtained before application of the pull force. When the pull force is to be applied to the stator core 1, in the present embodiment, the pull force is exerted in such a range as not to make the gap wider than about 5 mm. If the gap is wider than about 5 mm, the stator core 1 is plastically deformed and thus does not return to its original shape by the elasticity. Accordingly, the pull force in the range causing no plastic deformation is applied to the stator core 1.

With the above configuration, all the coils C can be mounted on the teeth parts T without affecting the circularity and the end-face parallelism of the stator core 1.

As explained in detail above, according to the stator core 1 in the first embodiment, the following advantageous effects can be provided.

Figure 14:
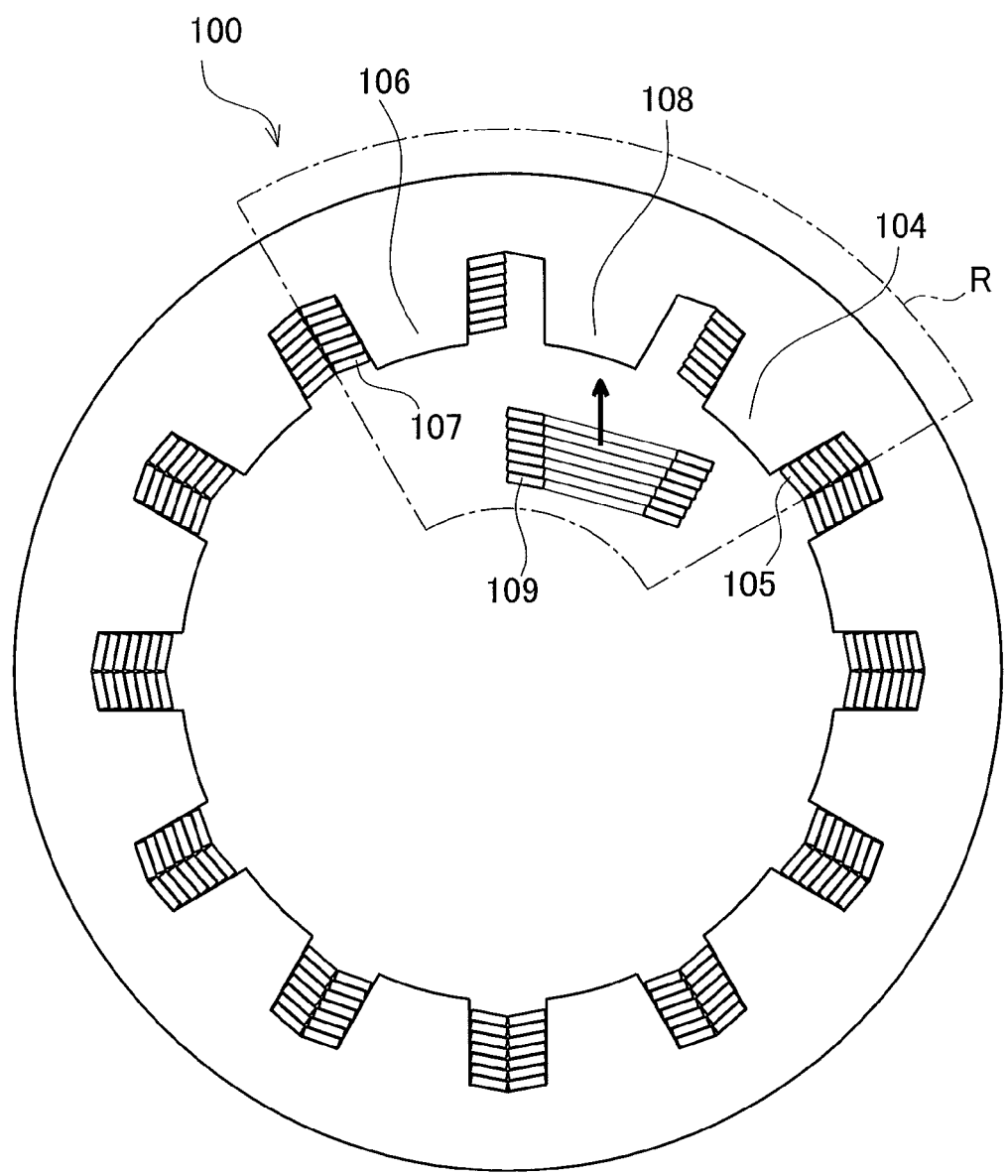
FIG. 14 is a diagram showing a step of mounting a coil in a stator core in a conventional art.
Figure 15:
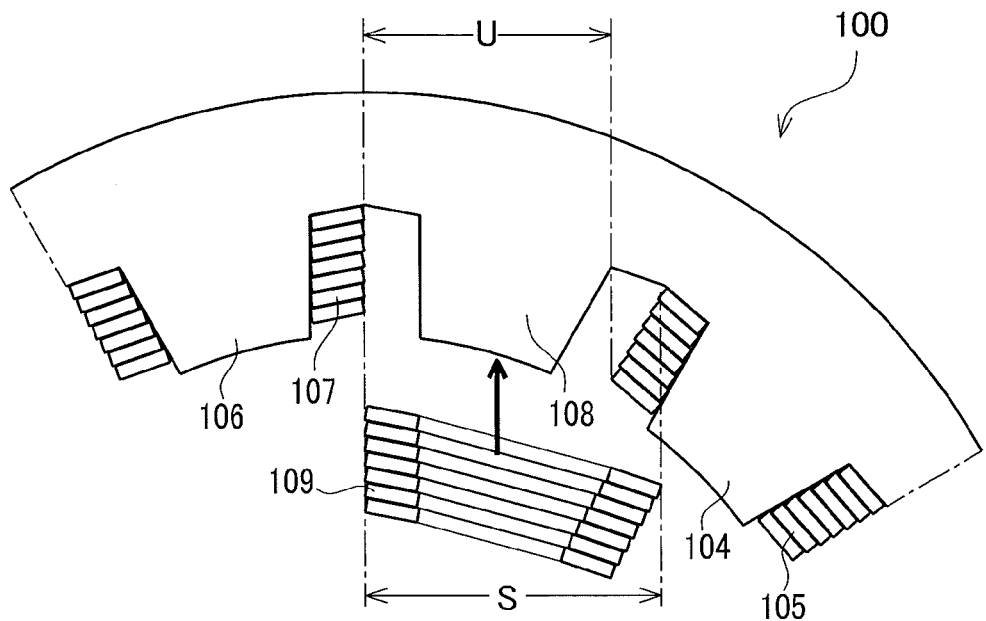
FIG. 15 is a partial enlarged view of a part enclosed by a chain line R in FIG. 14 in the conventional art.
Figure 16:
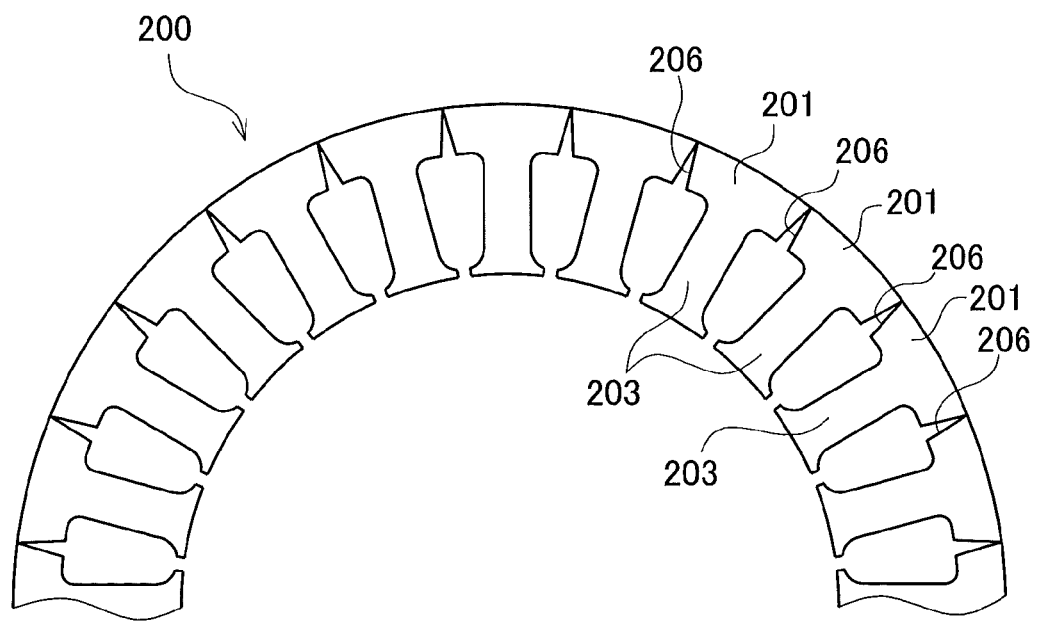
FIG. 16 is a partial enlarged view of a stator core in a Patent Document.

Since the cut section 50 is formed only in one place in the yoke part 12, it is possible to mount the coils C on the teeth parts T while maintaining the circularity and the end-face parallelism. The reason is as below. In the conventional stator core 100 shown in FIG. 14, the last coil 109 could not be mounted on the last teeth part 108. In contrast, according to the present embodiment, the cut section 50 is opened to allow mounting of the twelfth coil C12 on the last twelfth teeth part T12. When the cut section 50 is to be opened, the cut section 50 is opened in the elastically deformable range of the stator core 1. As long as the opening width is in the elastically deformable range of the stator core 1, the cut section 50 is not plastically deformed and the stator core 1 can return, by the elasticity, to its original shape having high circularity and high end-face parallelism.

Since the cut section 50 is formed only in one place, it is possible to directly mount the first coil C1 and others on the first teeth part T1 and others without opening the cut section 50 except for the case where the twelfth coil C12 is to be mounted on the twelfth teeth part T12. Accordingly, the cut section 50 has only to be opened only once in order to mount the twelfth coil C12 on the twelfth teeth part T12, so that the circularity and the end-face parallelism remain unchanged. Only one-time opening the cut section 50 makes it possible to enhance an assembling efficiency and reduce a manufacturing cost.

Opening the cut section 50 allows the twelfth coil C12 to be easily mounted on the twelfth teeth part T12. The reason is as below. The stator core 1 is made of laminated steel plates and thus has low rigidity. This allows the cut section 50 to be easily opened by a few of millimeters in the elastically deformable range. Since the cut section 50 formed in the yoke part 12 beside the twelfth teeth part T12 is allowed to be easily opened, the gap corresponding to the mountable width J needed to mount the twelfth coil C12 can be generated.

In the case where the cut section 50 is opened by about three millimeters in the elastically deformable range, when the cut section 50 is to be allowed to return to its original shape, the cut section 50 will naturally return to the original shape by the elasticity of the yoke part 12. Accordingly, the cut section 50 can easily return to the original shape without needing application of a returning force thereto. This can reduce a manufacturing cost.

Second Embodiment

A stator core 2 in a second embodiment is different from the stator core 1 in the first embodiment only in that a cut section 20 of the stator core 2 is different in shape from the cut section 50 of the stator core 1. The second embodiment is identical to the first embodiment except for the cut section and therefore will be explained with a focus on the cut section 20 without repeating the explanation of other parts or components.

The second embodiment in which other parts or components are not explained can also provide the same operations and advantageous effects as those in the first embodiment.

Modified Example of Shape of Cut Section in Radial Direction

Figure 6:
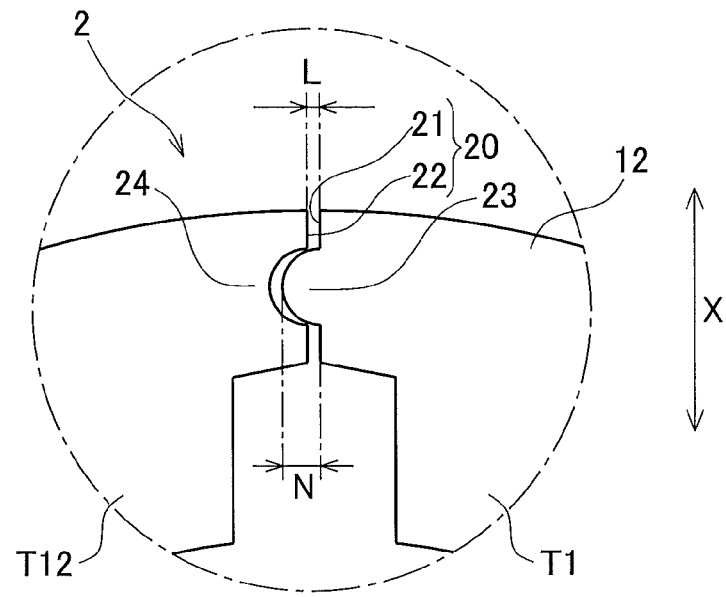
FIG. 6 is a partial enlarged view of a shape (1) of a cut section in a second embodiment of the invention.

FIG. 6 is a partial enlarged view of a shape (1) of the cut section 20 of the stator core 2. As shown in FIG. 6, the stator core 2 is formed with the cut section 20 extending in a radial direction. The cut section 20 is formed through all the thin steel plates. When a pull force is applied to the stator core 2, therefore, the cut section 20 is opened or split. The cut section 20 includes one end 21 formed on the first teeth part T1 side of the yoke part 12 and the other end 22 formed on the twelfth teeth part T12 side of the yoke part 12. Opening the cut section 20 therefore means that the one end 21 and the other end 22 are separated from each other. While no force is applied to the cut section 20, the one end 21 and the other end 22 are in contact with each other.

The one end 21 may be formed with an engagement protrusion 23 having a curved surface at a distal end and the other end 22 may be formed with an engagement recess 24 having a curved surface engageable with the engagement protrusion 23. The protrusion 23 and the recess 24 are formed in a radial direction X.

The protrusion 23 has a length N longer than a width of the gap L at which the cut section 20 is opened. A depth of the recess 24 engaging with the protrusion 23 is equal to the length N of the protrusion 23. For instance, if the width of the gap L is about 3 mm, the length N of the protrusion 23 and the depth of the recess 24 are respectively set to be 4 mm or more.

Figure 7:
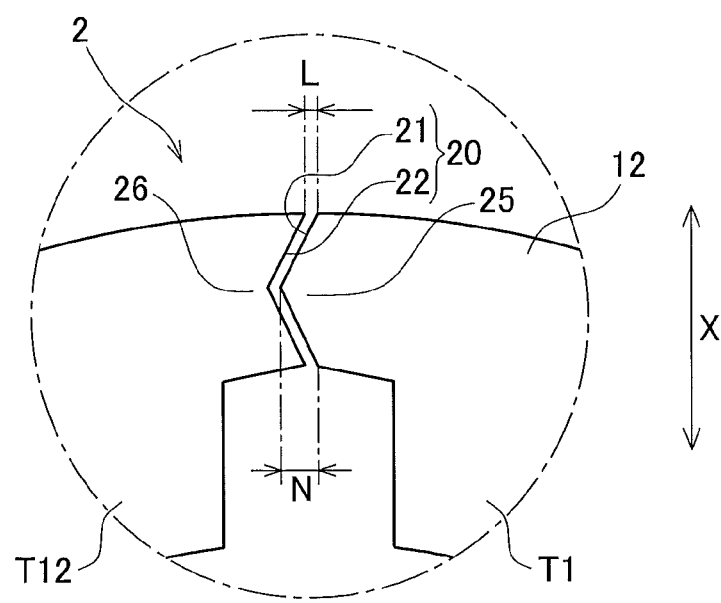
FIG. 7 is a partial enlarged of a shape (2) of the cut section in the second embodiment of the invention.

FIG. 7 is a partial enlarged view of a shape (2) of the cut section 20 of the stator core 2. Furthermore, the shape of the cut section 20 is not limited to the shape having such a curved end as shown in FIG. 6 and may be a shape having a triangular end as shown in FIG. 7. Specifically, as shown in FIG. 7, the cut section 20 may be formed with an engagement protrusion 25 having a triangular protruding shape and an engagement recess 26 having a triangular recessed shape engageable with the protrusion 25. These protrusion 25 and recess 26 are formed in a radial direction X.

The protrusion 25 has a length N longer than a width of the gap L at which the cut section 20 is opened. A depth of the recess 26 engaging with the protrusion 25 is equal to the length N of the protrusion 25. For instance, if the width of the gap L is about 3 mm, the length of the protrusion 25 and the depth of the recess 26 are respectively set to be 4 mm or more.

(Operations and Advantageous Effects of Shape of Cut Section in Radial Direction)

With the engagement protrusion 23 and the engagement recess 24 shown in FIG. 6, it is possible to restrain a displacement of the stator core 2 shown in FIG. 6 in the radial direction when the stator core 2 is elastically deformed. By restraining the displacement in the radial direction, the stator core 2 can return to its original shape having high circularity and high end-face parallelism.

The reason thereof is as below. While the cut section 20 having been opened is fully returning to its original shape by the elasticity, the protrusion 23 and the recess 24 serve as a guide for the returning motion. Owing to the protrusion 23 and the recess 24, the cut section 20 can return to its original position. Since the cut section 20 can return to the original position, the stator core 2 can return to a shape having high circularity and high end-face parallelism without being plastically deformed.

Furthermore, the length N of the engagement protrusion 23 is set to 4 mm or more, which is longer than the width of the gap L of about 3 mm for opening the cut section 20, so that the protrusion 23 does not disengage from the recess 24 during coil assembling. Accordingly, the protrusion 23 and the recess 24 can serve as a guide to prevent the stator core 2 from disassembling.

The stator core 2 having the protrusion 23 and the recess 24 in the radial direction X can be made by use of a single press die used for shaping a steel plate. Since the stator core 2 having the protrusion 23 and the recess 24 can be manufactured by use of the single press die, a manufacturing cost can be reduced than in the case where engagement portions are formed in a lamination direction. To manufacture the stator core having the engagement portions in the lamination direction, steel plates have to be made in at least two patterns.

In the case where the engagement protrusion 25 and the engagement recess 26 shown in FIG. 7 are formed, they can provide the same effects as the engagement protrusion 23 and the engagement recess 24 having curved end faces shown in FIG. 6. Since the protrusion 25 and the recess 26 in FIG. 7 can provide the same effects, their explanations are omitted.

Third Embodiment

A stator core 3 in a third embodiment is different from the stator core 1 in the first embodiment only in that the shape of a cut section 30 of the stator core 3 is different from the shape of the cut section 50 of the stator core 1. The third embodiment is identical to the first embodiment except for the cut section and thus is explained with a focus on the cut section 30 without repeating the explanation of other parts or components.

The third embodiment in which other parts or components are not explained can also provide the same operations and advantageous effects as those in the first embodiment.

Modified Example of Shape of Cut Section in Lamination Direction

Figure 8:
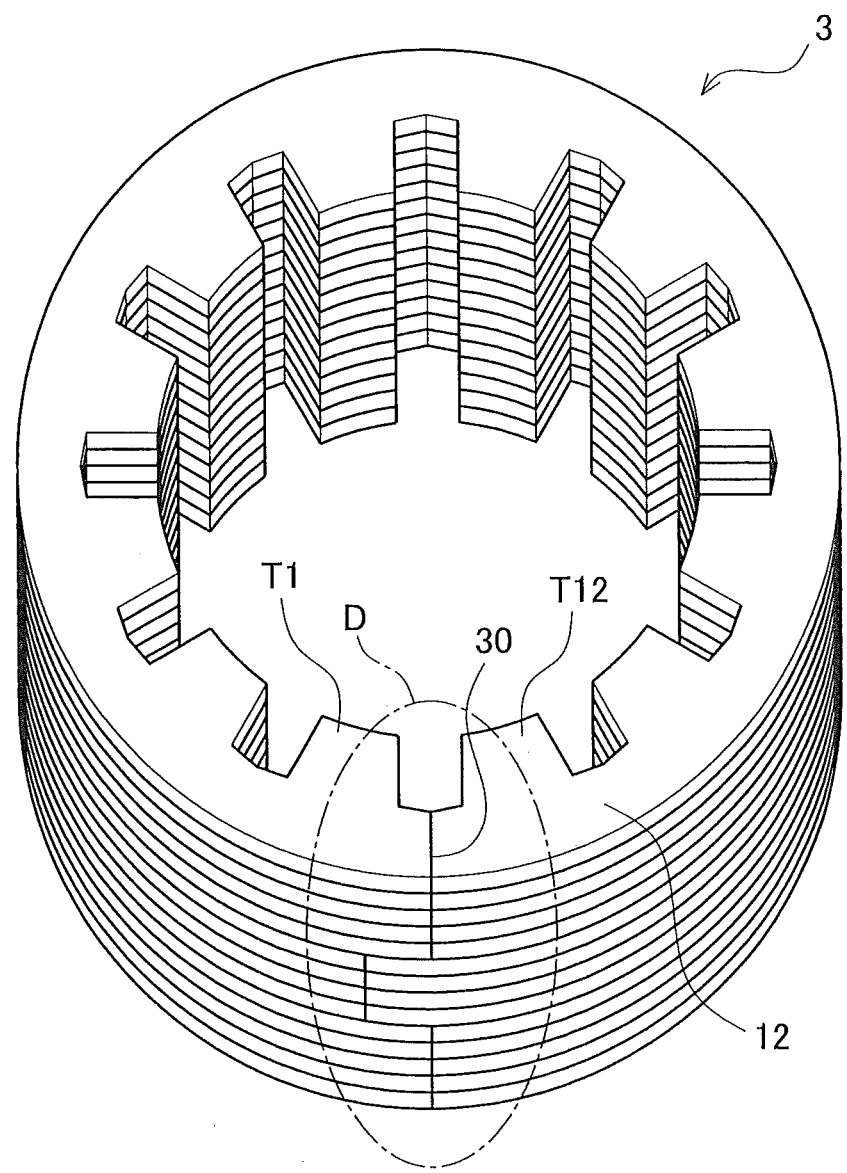
FIG. 8 is a perspective external view of a stator core in a third embodiment of the invention.
Figure 9:
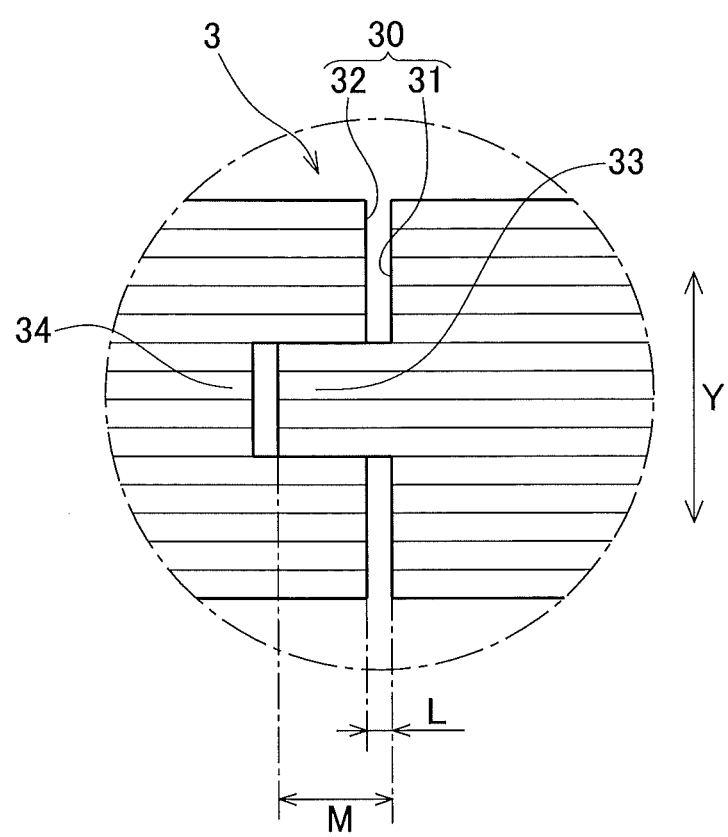
FIG. 9 is a partial enlarged view of a part enclosed by a chain line D in FIG. 8 in the third embodiment t of the invention.

FIG. 8 is an external perspective view of the stator core 3 in the third embodiment. FIG. 9 is a partial enlarged view of a part of the stator core 3 enclosed by a dashed-chain line D in FIG. 8.

The stator core 3 is formed with the cut section 30 extending in a radial direction as shown in FIG. 8. The cut section 30 is formed through all the thin steel plates and thus is opened or split when a pull force is applied to the stator core 3. The cut section 30 includes one end 31 formed on the first teeth part T1 side of the yoke part 12 and the other end 32 formed on the twelfth teeth part T12 side of the yoke part 12. Opening the cut section 30 therefore means that the one end 31 and the other end 32 are separated from each other. While no force is applied to the cut section 30, the one end 31 and the other end 32 are in contact with each other as shown in FIG. 8.

As shown in FIG. 9, the one end 31 may be formed with an engagement protrusion 33 and the other end 32 may be formed with an engagement recess 34 engageable with the protrusion 33. The protrusion 33 and the recess 34 are formed in a lamination direction Y.

The protrusion 33 has a length M longer than a width of the gap L at which the cut section 30 is opened. The recess 34 engaging with the protrusion 33 has a depth equal to the length M of the protrusion 33. For instance, in the case where the width of the gap L is about 3 mm, the length M of the protrusion 33 and the depth of the recess 34 are respectively set to be 4 mm or more.

(Operations and Advantageous Effects of Shape of Cut Section in Lamination Direction)

Owing to the presence of the engagement protrusion 33 and the engagement recess 34 formed as shown in FIGS. 8 and 9, it is possible to restrain a displacement of the stator core 3 in the lamination direction Y in FIG. 9 when the stator core 3 is elastically deformed. Since the displacement in the lamination direction Y is prevented, the stator core 3 can return to its original shape with high circularity and high end-face parallelism. The reason is as below. The protrusion 33 and the recess 34 serve as a guide to fully return the opened cut section 30 to an original position. With those protrusion 33 and recess 34, the cut section 30 can return completely to the original position. Consequently, the stator core 3 can return to the shape having high circularity and high end-face parallelism without causing plastic deformation.

Since the length M of the engagement protrusion 33 is longer than the width of the gap L for opening the cut section 30 during coil assembling, the protrusion 33 does not disengage from the recess 34. Therefore, the protrusion 33 and the recess 34 can serve as a guide to prevent the stator core 3 from disassembling.

Furthermore, the thickness of the stator core 3 in the lamination direction is larger than the thickness in the radial direction, so that the protrusion 33 and the recess 34 can be formed in two or more places in the lamination direction. Specifically, the third embodiment includes the protrusion 33 and the recess 34 each in one place but may include a plurality of engagement protrusions and a plurality of engagement recesses. In the case of including the engagement protrusions and the engagement recesses, the cut section 30 can fully return to the original position more reliably.

Fourth Embodiment

A stator core 4 in a fourth embodiment is different from the stator core 1 in the first embodiment only in that the stator core 4 is formed with a one-end protrusion 41 and an other-end protrusion 42 each protruding outward from the yoke part 12. Thus, the fourth embodiment is explained with a focus on a cut section 70 without repeating explanation of other parts or components. The fourth embodiment in which explanations of other parts or components are omitted can provide the same operations and advantageous effects as those in the first embodiment.

(Configuration of One-End Protrusion and Other-End Protrusion)

Figure 10:
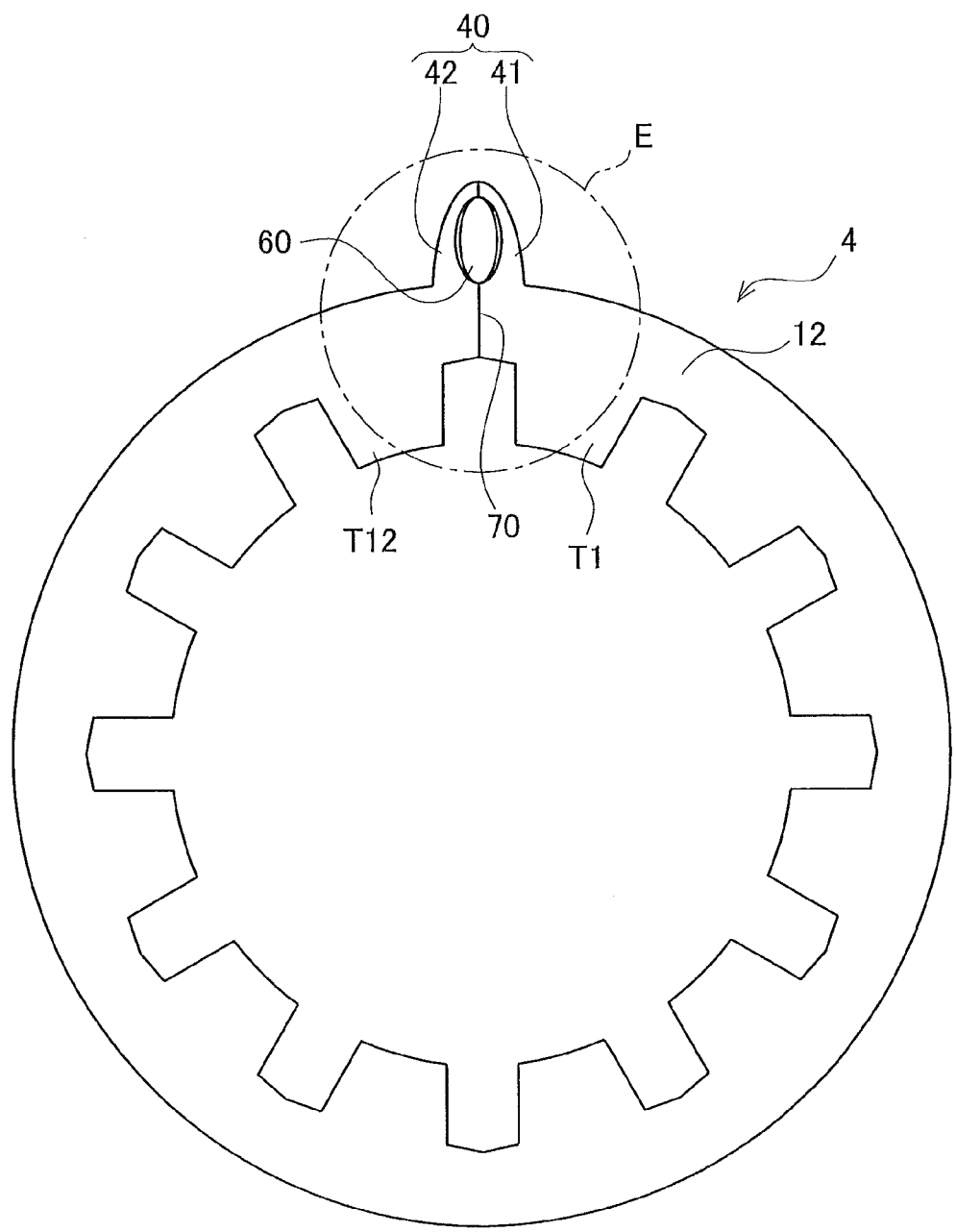
FIG. 10 is a front view of a stator core in a fourth embodiment of the invention.
Figure 11:
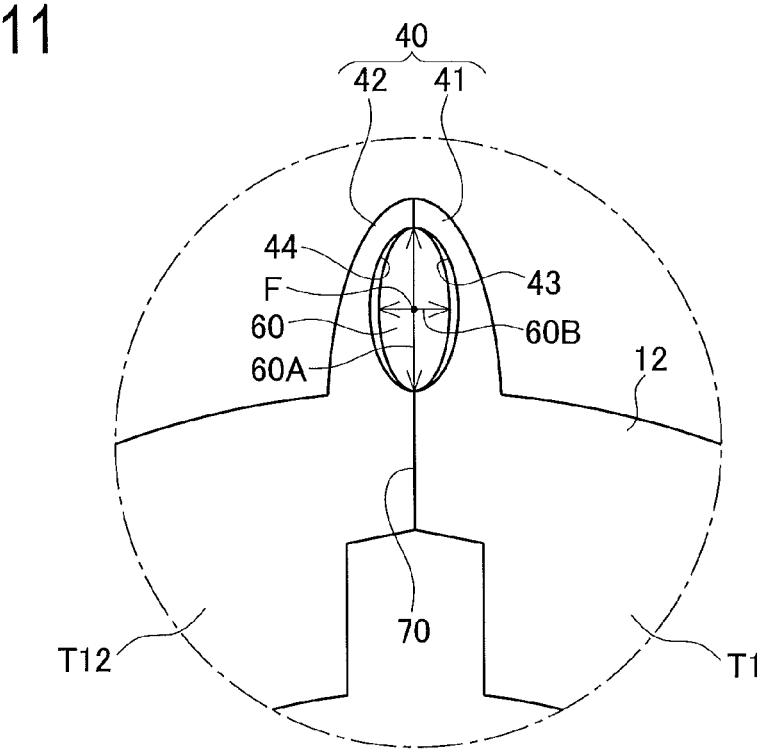
FIG. 11 is a partial enlarged view (1) of a part enclosed by a chain line E in FIG. 10 in the fourth embodiment of the invention.
Figure 12:
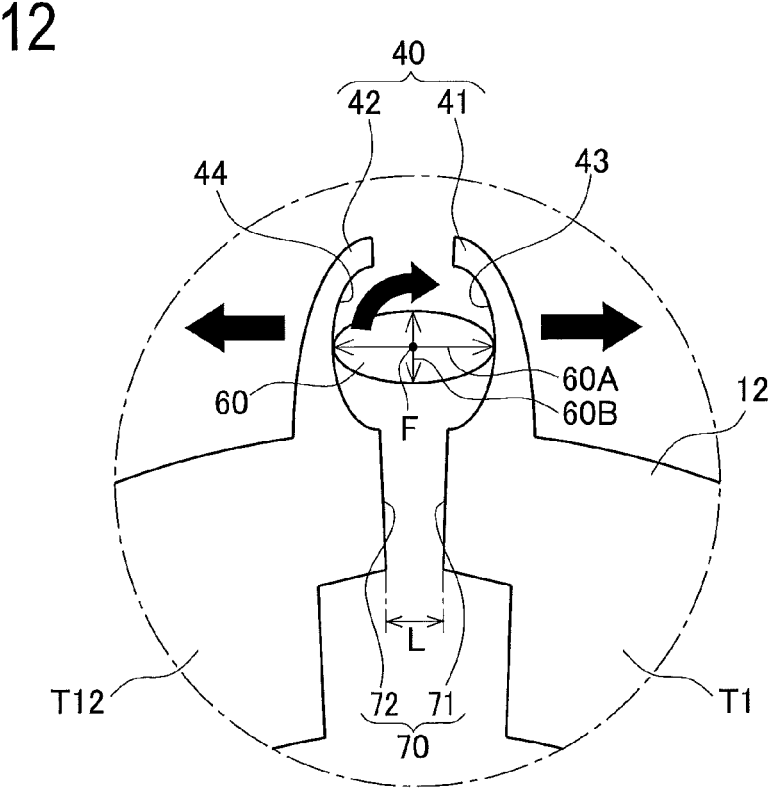
FIG. 12 is a partial enlarged view (2) of the part enclosed by the chain line E in FIG. 10 in the fourth embodiment of the invention.

FIG. 10 is a front view of the stator core 4 in the fourth embodiment. FIG. 11 is a partial enlarged view (1) of a part enclosed by a chain line E in FIG. 10 in the fourth embodiment. FIG. 12 is a partial enlarged view (2) of the part enclosed by the chain line E in FIG. 10 in the fourth embodiment. As shown in FIG. 12, the one-end protrusion 41 and the other-end protrusion 42 are formed each protruding outward from the outer periphery of the yoke part 12. The one-end protrusion 41 is formed on a side of one end 71 of both end portions of a cut section 70, while the other-end protrusion 42 is formed on a side of the other end 72 of both end portions of the cut section 70. As shown in FIG. 10, the one-end protrusion 41 and the other-end protrusion 42 constitute an outward protruding portion 40.

A one-end gap forming recess 43 of a semielliptic shape is formed in a contact surface of the one-end protrusion 41 that contacts with the other-end protrusion 42. An other-end gap forming recess 44 of a semielliptic shape is formed in a contact surface of the other-end protrusion 42 that contacts with the one-end protrusion 41. When the one-end protrusion 41 and the other-end protrusion 42 are placed in contact relation, their recesses 43 and 44 form a through hole of a hollow elliptic cylindrical shape. In the present embodiment, the recesses are provided as through holes, but may be formed in a concave or recessed shape, not a through hole shape.

(Operations and Advantageous Effects of One-End Protrusion and Other-End Protrusion)

The one-end protrusion 41 and the other-end protrusion 42 are used in the second step to open the cut section 70 from a closed position shown in FIG. 11 to generate a gap L as shown in FIG. 12. The gap L in the fourth embodiment is about 3 mm. The stator core 4 in the fourth embodiment is formed with the one-end gap forming recess 43 of a semielliptic shape in the contact surface of the one-end protrusion 41 that contacts with the other-end protrusion 42 and the other-end gap forming recess 44 of a semielliptic shape in the contact surface of the other-end protrusion 42 that contacts with the one-end protrusion 41.

As shown in FIGS. 10 and 11, an elliptic cylindrical tool 60 is inserted in the hollow elliptic cylindrical though hole defined by the recesses 43 and 44. The tool 60 has a size smaller than the elliptic cylindrical through hole and thus can be inserted in the through hole. As shown in FIG. 12, the tool 60 is inserted in the through hole and then rotated 90° about a center point F. By this 90°-rotation of the tool 60, the one-end protrusion 41 and the other-end protrusion 42 are separated from each other by a distance corresponding to a value obtained by subtracting a minor axis 60B from a major axis 60A of the elliptic shape. Accordingly, the simple 90°-rotation of the elliptic cylindrical tool 60 makes it easy to open the cut section 70.

Furthermore, by the 90°-rotation of the elliptic cylindrical tool 60, the one-end protrusion 41 and the other-end protrusion 42 can be separated accurately by the distance corresponding to the value obtained by subtracting the minor axis 60B from the major axis 60A of the elliptic shape.

Accordingly, by use of the tool 60, it is possible to accurately apply a force to the stator core 4 in an elastically deformable range. The tool 60 can therefore be returned to its original position without causing plastic deformation of the stator core 4. Thus, the stator core 4 can maintain the circularity and the end-face parallelism at the same level as before the use of the tool 60.

By using the tool 60, the one-end protrusion 41 and the other-end protrusion 42 are moved apart from each other. The cut section 70 can therefore be easily opened.

Furthermore, since the cut section 70 is formed with the one-end protrusion 41 and the other-end protrusion 42, the cut section 70 can be opened while keeping the circularity and the end-face parallelism of the stator core 4. The reason is as below. The one-end protrusion 41 and the other-end protrusion 42 are formed on the outer periphery of the yoke part 12 needing to maintain the circularity and end-face parallelism. Therefore, the cut section 70 can be opened while keeping the circularity and the end-face parallelism of the yoke part 12 more reliably in the case where the one-end protrusion 41 and the other-end protrusion 42 formed on the outer periphery of the yoke part 12 are separated than in the case where the yoke part 12 needing to maintain the circularity and end-face parallelism is directly opened.

When a force is directly applied to the yoke part 12, the yoke part 12 may be deformed, resulting in that the circularity and end-face parallelism cannot be maintained. However, when a force is directly applied to the one-end protrusion 41 and the other-end protrusion 42 formed on the outer periphery of the yoke part 12, the yoke part 12 needing to maintain the circularity and the end-face parallelism is not deformed. Thus, the circularity and the end-face parallelism can be kept.

Furthermore, separating the one-end protrusion 41 and the other-end protrusion 42 formed on the outer periphery of the yoke part 12 is easier than directly separating the yoke part 12 by application of a force thereto. This is because the outward protruding portion 40 formed distantly from the stator core 4 needs only a small force to open the cut section 70. Accordingly, opening the outward protruding portion 40 can easily open the cut section 70 formed in the yoke part 12. This can enhance the assembling efficiency to mount the twelfth coil C12 on the last twelfth teeth part T12 and also reduce the manufacturing cost.

The present invention is not limited to the above embodiments and may be embodied in other specific forms without departing from the essential characteristics thereof.

For instance, it may combine the engagement protrusion and the engagement recess in the radial direction in the second embodiment with the engagement protrusion and the engagement recess in the lamination direction in the third embodiment. This combination of both configurations allows the cut section to fully return to the original position more reliably when returning by the elasticity.

For instance, the features of the stator cores in the first to fourth embodiments may be combined. This combined configuration can provide operations and advantageous effects obtainable from respective features.

REFERENCE SIGNS LIST

1 Stator core
C Coil
C1 to C12 First coil to twelfth coil
T Teeth part
T1 to T12 First teeth part to twelfth teeth part
12 Yoke part
50 Cut section
51 One end of cut section
52 Other end of cut section

The invention claimed is:

1. A stator manufacturing method including mounting a plurality of trapezoidal coils on a stator core made of laminated steel plates and provided with a yoke part and teeth parts so that the coils are wound around the teeth parts,
  wherein the yoke part is formed with a cut section only in one place,
  the method includes:
  a first step of mounting the coils excepting a last coil on the teeth parts; and
  a second step of mounting the last one of the coils on the teeth part by applying a pull force to the stator core in an elastically deformable range of the stator core to open the cut section in a circumferential direction of the stator core so that the stator core returns to its original shape by its elasticity.

2. The stator manufacturing method according to claim 1, wherein
  an engagement protrusion is formed in one end of the both end portions of the cut section, and
  an engagement recess is formed in the other end of the both end portions, the engagement recess being engageable with the engagement protrusion.

3. The stator manufacturing method according to claim 2, wherein
  the engagement protrusion is formed in a lamination direction, and
  the engagement recess is formed in the lamination direction.

4. The stator manufacturing method according to claim 2, wherein
  the engagement protrusion is formed in a radial direction, and
  the engagement recess is formed in the radial direction.

* * * * *

UNITED STATES PATENT AND TRADEMARK OFFICE
CERTIFICATE OF CORRECTION

PATENT NO. : 9,048,704 B2
APPLICATION NO. : 13/695546
DATED : June 2, 2015
INVENTOR(S) : F. Tanahashi et al.

It is certified that error appears in the above-identified patent and that said Letters Patent is hereby corrected as shown below:

Specification

At column 2, line 65, delete "(Deleted)" and the resulting blank line.

Signed and Sealed this
Fifth Day of January, 2016

Michelle K. Lee
*Director of the United States Patent and Trademark Office*